US008565758B2

(12) United States Patent
Owyang et al.

(10) Patent No.: US 8,565,758 B2
(45) Date of Patent: Oct. 22, 2013

(54) INTEGRATED WIRELESS NETWORK AND ASSOCIATED METHOD

(75) Inventors: Ethan Owyang, Everett, WA (US); David T. Kirkland, Kent, WA (US); Frank L. Whetten, Seattle, WA (US); Scott Edward Marston, Bellevue, WA (US); Bradley J. Mitchell, Snohomish, WA (US); Kenneth P. Kirchoff, Redmond, WA (US); Sudhakar S. Shetty, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 370 days.

(21) Appl. No.: 12/701,931

(22) Filed: Feb. 8, 2010

(65) Prior Publication Data

US 2011/0195656 A1 Aug. 11, 2011

(51) Int. Cl.
*H04W 4/00* (2009.01)
*H04W 24/00* (2009.01)
*H04B 7/15* (2006.01)
*H04B 7/185* (2006.01)
*H04B 7/14* (2006.01)
*H04B 7/204* (2006.01)
*H04B 7/216* (2006.01)
*H04B 7/212* (2006.01)
*H04J 1/10* (2006.01)
*H04J 3/08* (2006.01)

(52) U.S. Cl.
USPC ...... 455/431; 455/11.1; 455/12.1; 455/456.4; 455/13.1; 455/15; 455/17; 370/338; 370/315; 370/316; 370/319; 370/320; 370/321

(58) Field of Classification Search
USPC .............. 455/11.1, 12.1, 456.4, 13.2, 15, 17, 455/431; 370/338, 315, 316, 319, 320, 321; 340/971
See application file for complete search history.

(56) References Cited

U.S. PATENT DOCUMENTS

| | | | |
|---|---|---|---|
| 7,715,853 B1 * | 5/2010 | Frerking et al. | 455/456.4 |
| 2004/0142658 A1 * | 7/2004 | McKenna et al. | 455/11.1 |
| 2006/0285529 A1 | 12/2006 | Hares et al. | |
| 2007/0064673 A1 | 3/2007 | Bhandaru et al. | |
| 2009/0243895 A1 * | 10/2009 | Mitchell et al. | 340/971 |

* cited by examiner

*Primary Examiner* — Opiribo Georgewill
(74) *Attorney, Agent, or Firm* — Alston & Bird LLP

(57) ABSTRACT

An integrated wireless network and associated method are provided for facilitating wireless communication onboard an aircraft. The integrated wireless network includes a wireless distribution system including a wired interface and a plurality of wireless radios. The wireless distribution system may also include a combiner and one or more antennas, such as leaky feeder antenna(s), extending through the cabin compartment of the aircraft. The combiner may provide the combined wireless signals to the antenna for transmission. And, the combiner may deconstruct wireless signals received by the antenna and provide the deconstructed wireless signals to a respective wireless radio. The integrated wireless network of this embodiment also includes one or more wireless data concentrators having a plurality of wireless radios in communication with the antenna. The plurality of wireless radios of the wireless distribution system and the wireless data concentrator may support wireless communications in accordance with a plurality of different protocols.

23 Claims, 8 Drawing Sheets

INTEGRATED WIRELESS NETWORK AND ASSOCIATED METHOD

TECHNOLOGICAL FIELD

Embodiments of the present disclosure relate generally to communications systems onboard an aircraft and, more particularly, to an integrated wireless network and associated method for facilitating wireless communication onboard an aircraft.

BACKGROUND

Modern aircraft include a number of different communications systems. These systems may include, for example, public cabin Wi-Fi connectivity systems, crew information systems, wireless passenger service units, wireless passenger control units, wireless emergency lighting systems, commercial mobile radio services, and the like.

Typically, the wireless systems onboard an aircraft operate as redundant, parallel wireless networks. In other words, the wireless systems operate as separate federated systems. Indeed, in such a federated wireless architecture, there is generally an undesirable proliferation of equipment to support the various wireless systems. In this regard, each wireless system may have its own communication protocol, hardware supplier and set of wireless access points. As a result of the redundancies, the overall weight, power requirements and cooling requirements for the wireless systems may be undesirably large when considered in the aggregate. The redundancy of the wireless systems may also diminish the network performance and complicate the security features. In light of the increasing demand and utilization of wireless systems onboard an aircraft, the deficiencies associated with redundant, parallel wireless networks are being and are expected to continue to be exacerbated.

As such, it would desirable to provide for wireless communications onboard an aircraft in a manner that is more sensitive to the weight contributed by the wireless communications equipment as well as the power requirements and cooling requirements demanded by the wireless communications equipment. Additionally, it would be desirable to provide for wireless communications onboard an aircraft in such a manner so as to facilitate communications between various wireless devices and to further facilitate the addition of other wireless systems and/or devices in the future.

BRIEF SUMMARY

An integrated wireless network and associated method are provided according to embodiments of the present disclosure for facilitating wireless communication onboard an aircraft. The integrated wireless network and associated method may have reduced weight as well as power and cooling requirements relative to comparable federated wireless networks as a result of the integration of the wireless networks. Among other things, embodiments of the integrated wireless network and associated method may provide a single wireless entry point to the wireless network, may provide wireless network connectivity for distributed and mobile applications utilizing multiple radio protocols, may provide coverage in the cabin compartment using a wireless distribution system and extended coverage outside of the cabin compartment and outside of the aircraft utilizing, for example, wireless relaying or mesh networks, may bridge wired systems and components onto the wireless network and may provide application developers with a uniform network platform on which to host the applications.

According to one embodiment, an integrated wireless network for facilitating wireless communication onboard an aircraft is provided. The integrated wireless network of this embodiment includes a wireless distribution system including a wired interface configured to support wireless communications. The wireless distribution system also includes a plurality of wireless radios configured to support wireless communications in accordance with a plurality of different protocols. The wireless distribution system may also include a combiner configured to combine the wireless signals received by the plurality of wireless radios and one or more antennas, such as a leaky feeder antenna, extending through the cabin compartment of the aircraft. The combiner may provide the combined wireless signals to the antenna for transmission throughout the cabin. And, the combiner may deconstruct wireless signals received by the antenna and provide the deconstructed wireless signals to a respective wireless radio. The integrated wireless network of this embodiment also includes one or more wireless data concentrators in communication with the antenna. At least one wireless data concentrator includes a plurality of wireless radios configured to support wireless communications in accordance with a plurality of different protocols. In one embodiment, at least one wireless data concentrator also includes a radio controller configured to manage the plurality of wireless radios.

The wireless data concentrators may include a first wireless data concentrator disposed within the cabin compartment and a second wireless data concentrator disposed outside of the cabin compartment. In this embodiment, the first wireless data concentrator may be configured to relay communications between the second wireless data concentrator and the antenna of the wireless distribution system. The first and second wireless data concentrators may be part of a relay network or a mesh network. In order to extend the integrated wireless network outside of the cabin compartment, the first wireless data concentrator may be positioned within a return air gap between the floor and the fuselage of the aircraft. Additionally or alternatively, the first wireless data concentrator may also be positioned proximate a window or window plug that is transparent to radio frequency signals.

The wireless distribution system may also include a base transceiver station configured to support mobile telephony communications onboard the aircraft. The wireless distribution system may also include a network control unit configured to prevent mobile telephones onboard the aircraft from establishing communications with a terrestrial mobile network.

In another embodiment, an aircraft is provided that includes a cabin compartment and an integrated wireless network for facilitating wireless communications onboard the aircraft. The integrated wireless network includes a wireless distribution system including a plurality of wireless radios configured to support wireless communications in accordance with a plurality of different protocols. The wireless distribution system also includes a combiner configured to combine the wireless signals received by the plurality of wireless radios and one or more antennas, such as a leaky feeder antenna, extending through the cabin compartment and configured to transmit the combined wireless signals. The integrated wireless network also includes a plurality of wireless data concentrators in communication with the antenna. At least one wireless data concentrator includes a plurality of wireless radios configured to support wireless communications in accordance with a plurality of different protocols. The plurality of wireless data concentrators may include, for example, a first wireless data concentrator disposed within the cabin compartment and a second wireless data concentrator disposed outside of the cabin compartment.

The first wireless data concentrator may be configured to relay communications between the second wireless data concentrator and the antenna of the wireless distribution system. The first and second wireless data concentrators may form a part of either a relay network or a mesh network. The first wireless data concentrator may be positioned within a return air gap between the floor and the fuselage of the aircraft. Alternatively, the first wireless data concentrator may be positioned proximate a window or window plug as transparent to radio frequency signals.

The wireless distribution system may also include a base transceiver station configured to support mobile telephony communications onboard the aircraft. The wireless distribution system may also include a network control unit configured to prevent mobile telephones onboard the aircraft from establishing communications with a terrestrial mobile network.

In a further embodiment, a method is provided that includes receiving wireless signals onboard an aircraft with a plurality of wireless radios and then combining the wireless signals. The method also provides for transmitting wireless signals, following combination, via one or more antennas, such as a leaky feeder antenna, that extends through a cabin compartment of the aircraft. Following transmission, the wireless signals are received with a wireless radio of a first wireless data concentrator and the wireless signals are then relayed from the first wireless data concentrator to a wireless radio of a second wireless data concentrator positioned outside of the cabin compartment of the aircraft.

The method of one embodiment may also include relaying wireless signals from the second wireless data concentrator via the first wireless data concentrator to the antenna that extends through the cabin compartment of the aircraft. In this embodiment, the wireless signals that are received by the antenna may be deconstructed and may thereafter be provided to a respective wireless radio.

The features, functions and advantages that have been discussed may be achieved independently in various embodiments of the present disclosure and may be combined in yet other embodiments, further details of which may be seen with reference to the following description and drawings.

BRIEF DESCRIPTION OF THE SEVERAL VIEWS OF THE DRAWINGS

Figure 1:
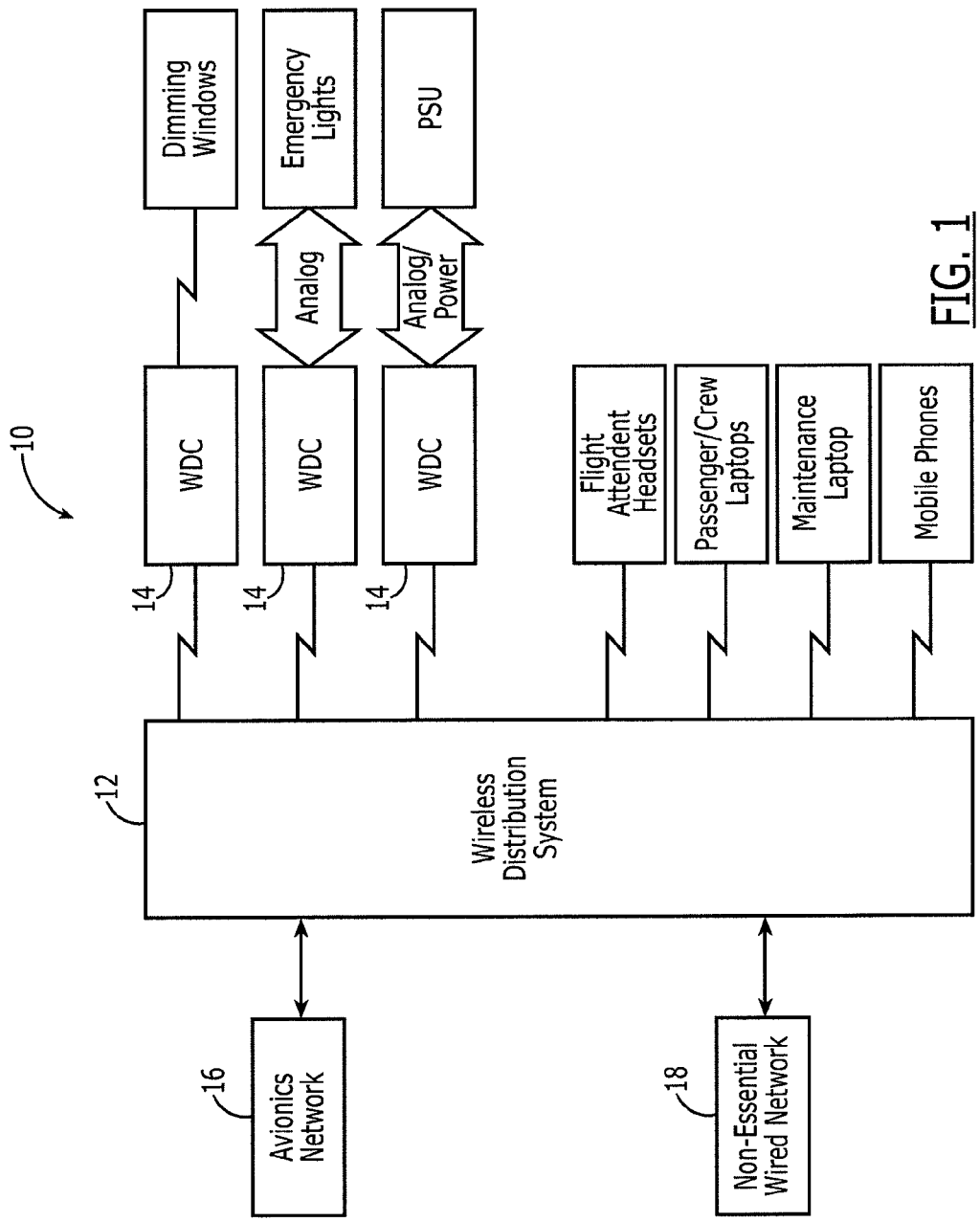
Figure 2:
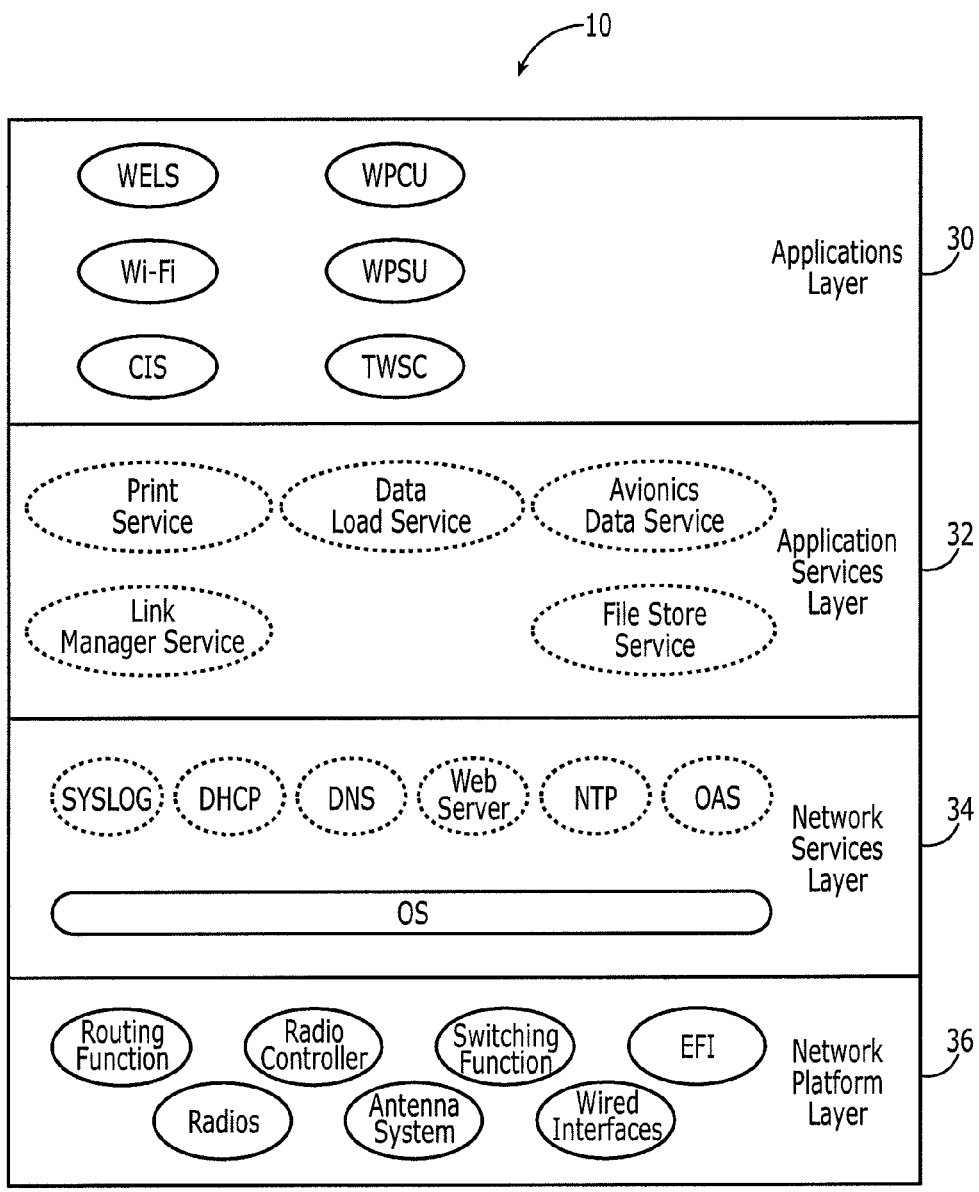
Figure 3:
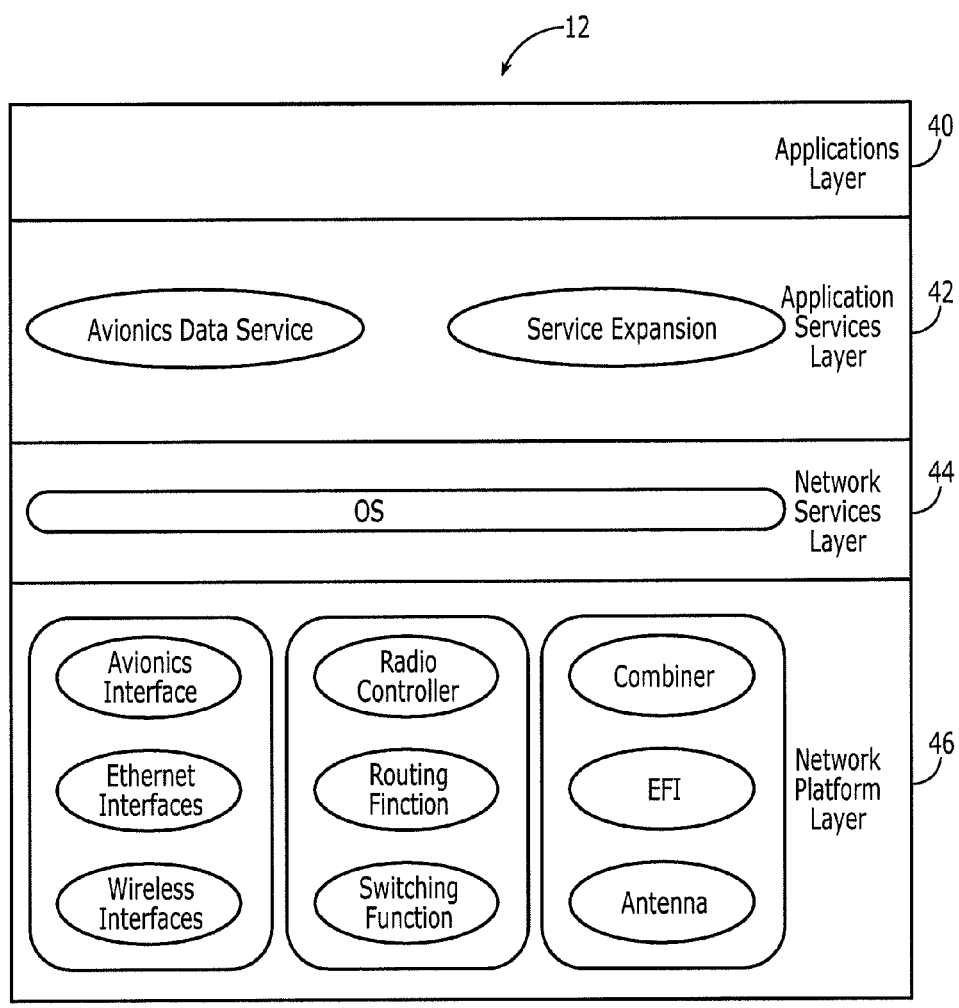
Figure 4:
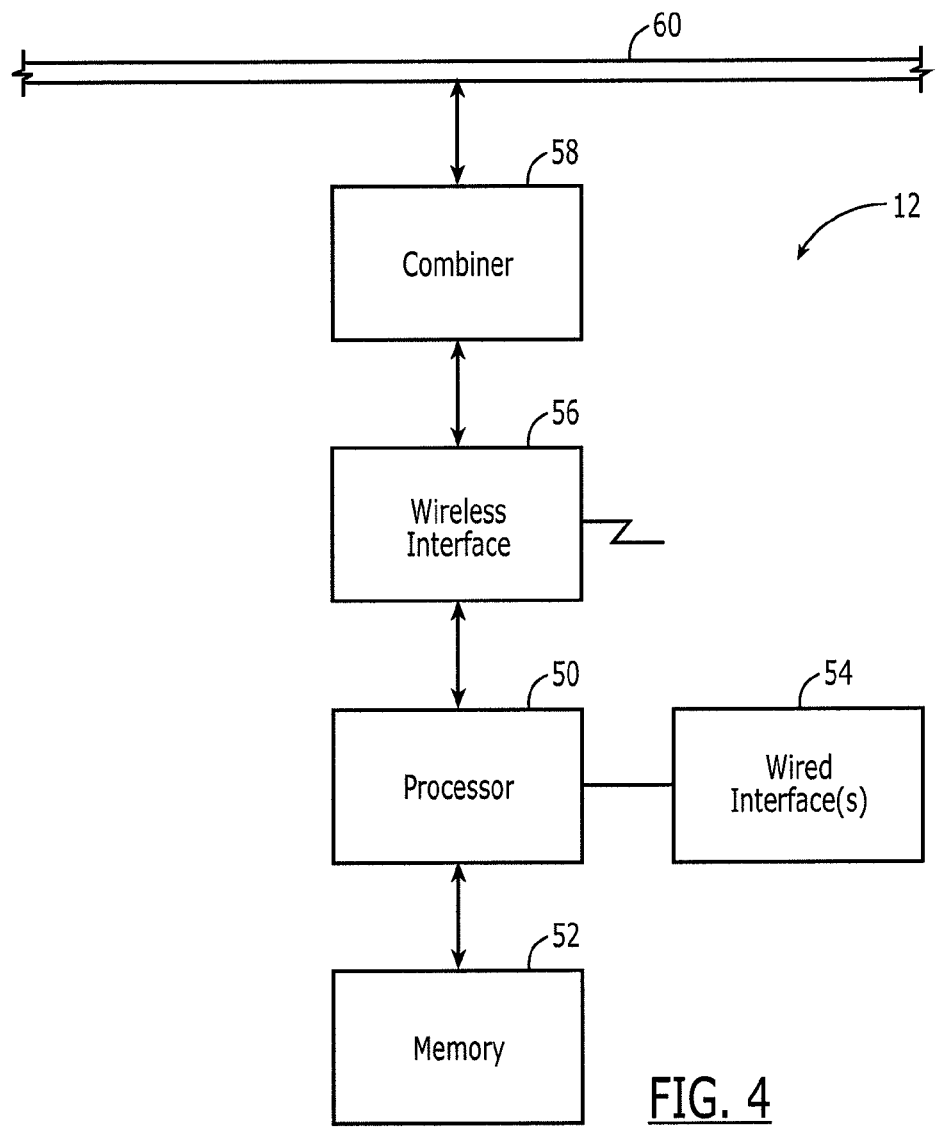
Figure 5:
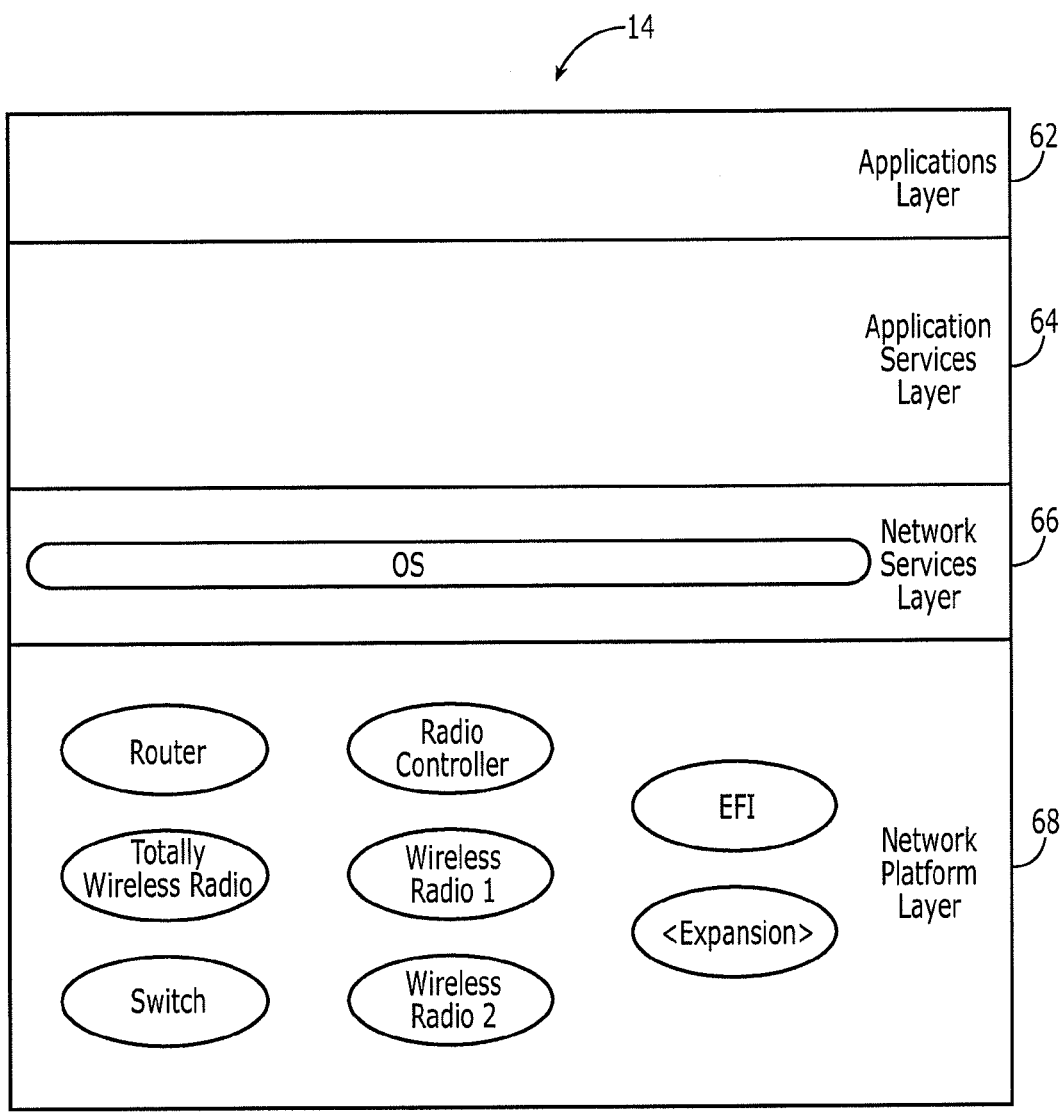
Figure 6:
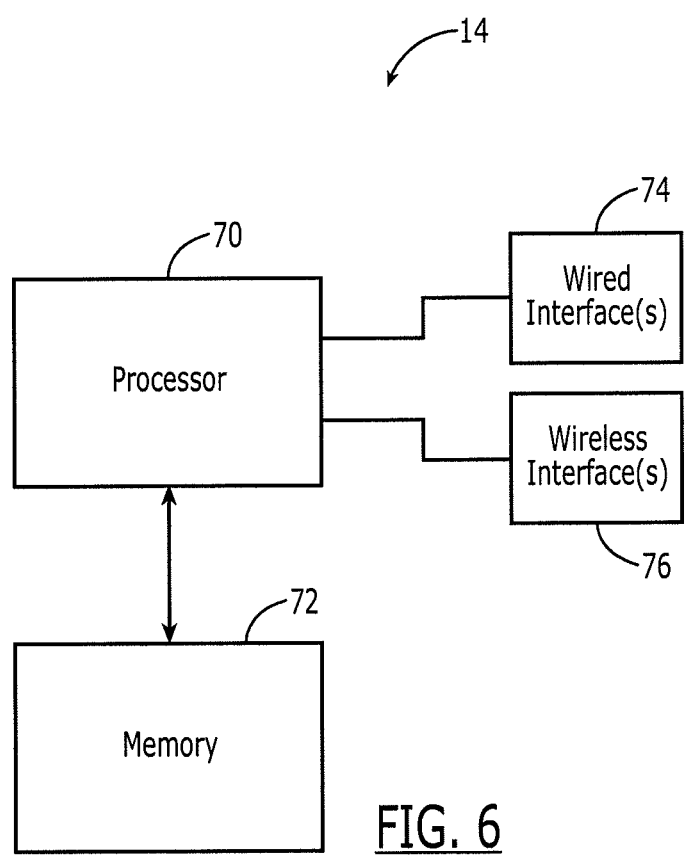
Figure 7:
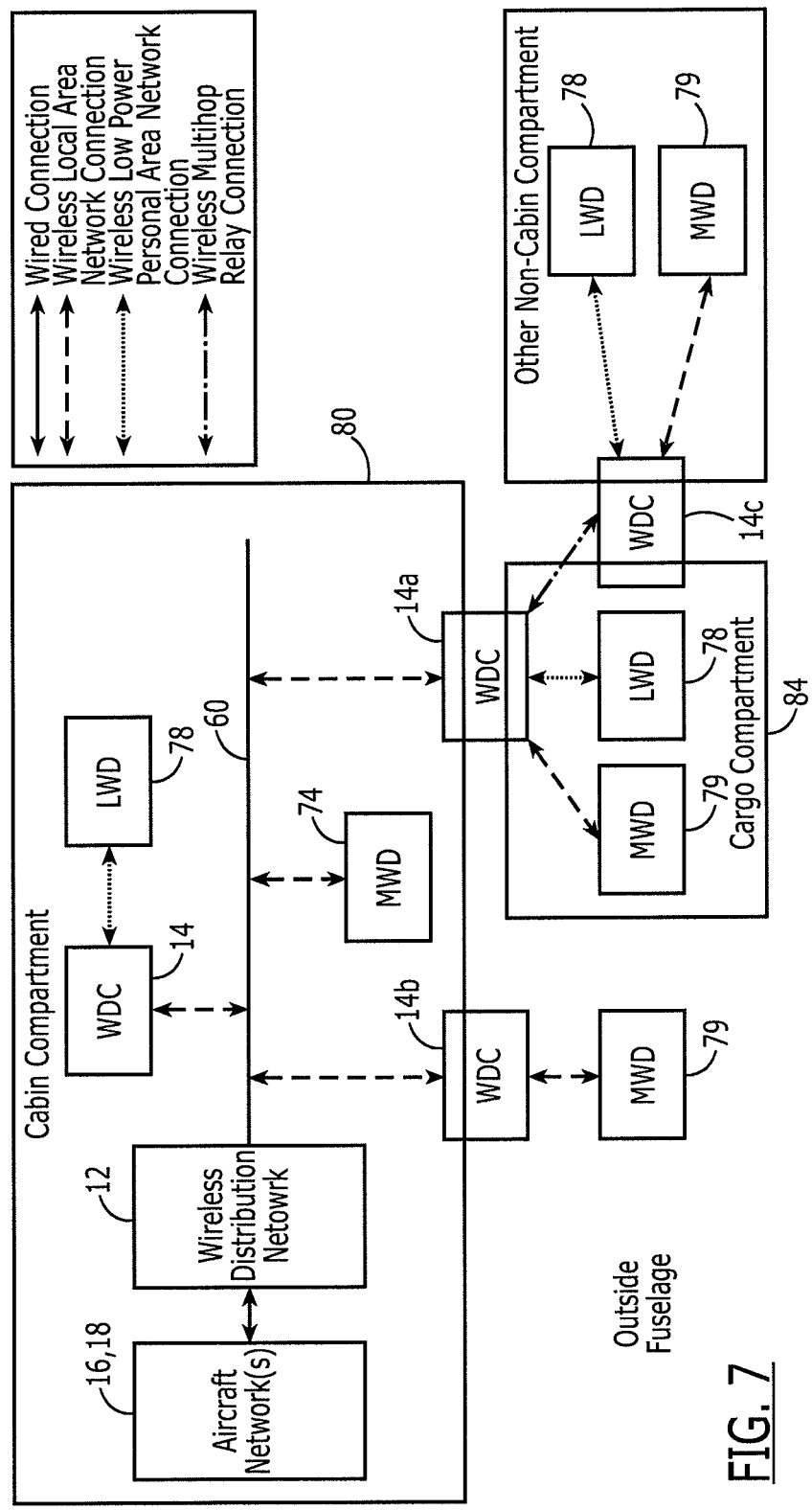
Figure 8:
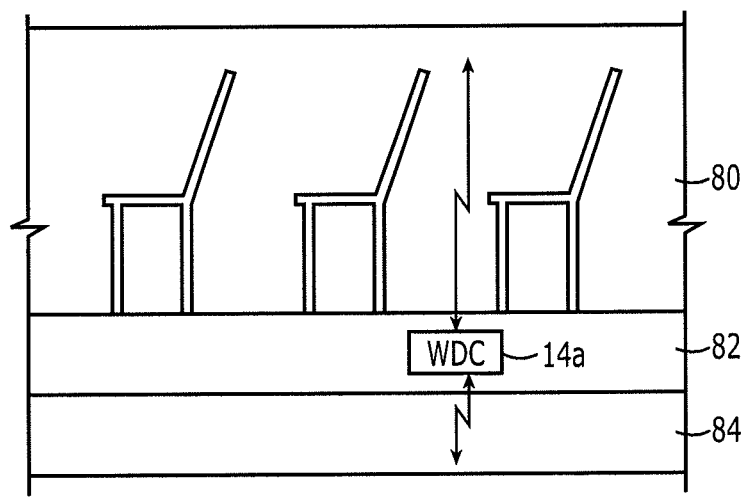
Figure 9:
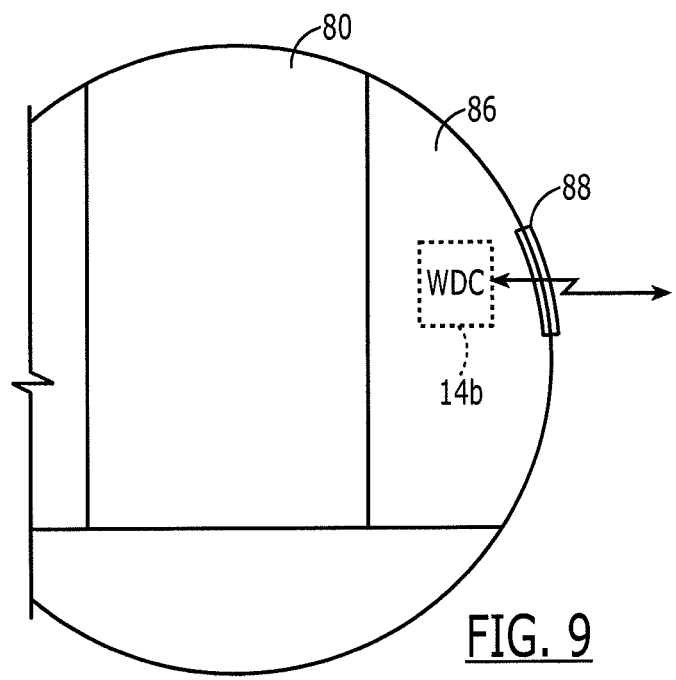

Having thus described embodiments of the present disclosure in general terms, reference will now be made to the accompanying drawings, which are not necessarily drawn to scale, and wherein:

FIG. 1 is a block diagram of an integrated wireless network according to one embodiment of the present disclosure which illustrates its interconnection with various other networks onboard an aircraft and with various clients;

FIG. 2 is a representation of the network architecture layers of an integrated wireless network in accordance with one embodiment;

FIG. 3 is a representation of the architecture layers of a wireless distribution system in accordance with one embodiment of the present disclosure;

FIG. 4 is a block diagram of a wireless distribution system in accordance with one embodiment of the present disclosure;

FIG. 5 is a representation of the architecture layers of a wireless data concentrator in accordance with one embodiment of the present disclosure;

FIG. 6 is a block diagram of a wireless data concentrator in accordance with one embodiment of the present disclosure;

FIG. 7 is a block diagram of an integrated wireless network in accordance with one embodiment of the present disclosure;

FIG. 8 is a schematic representation of a wireless data concentrator positioned within a return air gap in accordance with one embodiment of the present disclosure; and FIG. 9 is a schematic representation of a wireless data concentrator positioned proximate a window that is transparent to radio frequency signals in accordance with one embodiment of the present disclosure.

DETAILED DESCRIPTION

The present disclosure now will be described more fully hereinafter with reference to the accompanying drawings, in which some, but not all embodiments are shown. Indeed, this disclosure may be embodied in many different forms and should not be construed as limited to the embodiments set forth herein; rather, these embodiments are provided so that this disclosure will satisfy applicable legal requirements. Like numbers refer to like elements throughout.

An integrated wireless network 10 is provided in accordance with embodiments of the present disclosure in order to facilitate wireless communications onboard an aircraft. Referring now to FIG. 1, an integrated wireless network in accordance with one embodiment is depicted. As shown, the integrated wireless network includes a wireless distribution system 12 and a plurality of wireless data concentrators (WDCs) 14 in communication with the wireless distribution system. The wireless distribution system may also be in communication with one or more networks that are onboard the aircraft. Although the integrated wireless network may communicate with a variety of different networks onboard the aircraft, the embodiment of FIG. 1 illustrates two networks for purposes of example, but not of limitation.

As illustrated, these two example networks include an avionics network 16 and a non-essential wired network 18. The avionics network provides for network connectivity for different aircraft applications without compromising flight safety. There may be various non-essential wired networks, but one example of a non-essential wired network is a high-throughput, non-essential wired network architecture that supports IEEE 802.3 Ethernet-based non-essential airplane systems.

The integrated wireless network 10 and, in particular, the wireless distribution system 12 may utilize different types of interfaces to communicate with the various networks. For example, the wireless distribution system may utilize CAN-Bus technology to communicate with the avionics network 16 and Ethernet connections to separately communicate with the non-essential wired networks 18. In any event, the wireless distribution system generally includes at least one and, more typically, a plurality of wired interfaces configured to support wireline communications with various other networks onboard the aircraft. Thus, the wireless distribution system may serve to bridge wired systems, such as avionics network and the non-essential wired network, on to the wireless network described below so as to support communications between the wired systems and the wireless network and its wireless clients.

The architecture of the integrated wireless network 10 may be organized into four abstraction layers that are shown in FIG. 2 and that are designated integrated wireless network applications 30, applications services 32, network services 34, and the network platform 36. By organizing the architecture into the abstraction layers, the different layers may operate independently with only the knowledge of their mutual and predefined interfaces so as to facilitate flexibility. In this regard, changes in a particular abstraction layer do not impact other layers so long as the standard interface between the layers is maintained.

The integrated wireless network application layer 30 generally refers to the onboard systems and applications that utilize the network architecture and interface with the integrated wireless network 10. This layer may subscribe to services provided by the integrated wireless network or its other clients or may provide and advertise its own services. Although this layer may include various applications, some examples of applications that may be included within the integrated wireless network applications layer as shown in FIG. 2 include the public cabin Wi-Fi connectivity application to enable passengers, flight crew and cabin crew to access the public Internet wirelessly via various mobile devices. In this regard, the integrated wireless network may provide the onboard wireless link and an interface to the non-essential wired network which, in turn, provides an interface to the offboard link. Another application is the crew information system (CIS) application which is a set of services provided over wired and wireless network connections for pilots, cabin crew and mechanics for use during in-flight and/or on-ground operations. The CIS is designed to support a wide variety of airline, airplane and crew duties including pre-flight and flight operations, passenger cabin duties as well as to support maintenance operations and ramp activities in and around the aircraft including, for example, maintenance logs and reporting, data load and part distribution. The wireless passenger service unit (WPSU) is another application that provides passenger service functions, such as reading lights, and cabin attendant call lights. The integrated wireless network may provide wireless communication between the WPSU and the CSS. The wireless passenger control unit (WPCU) is another application that may be supported by the integrated wireless network and is the control mechanism by which a passenger may enable/disable reading lights and attendant call lights. Via the integrated wireless network, the WPCU is able to wirelessly connect directly to the CSS.

Another example of the integrated wireless network applications may be the wireless emergency lighting system (WELS) which consists of aircraft lighting control and feedback and includes distributed control units with battery-powered lights and signs to provide evacuation guidance during emergency egress. An onboard mobile telephony service application may also be supported. Another application that may be supported is the totally wireless sensing and control (TWSC) application for providing sensing and control of totally wireless devices, that is, wireless devices that are not connected to aircraft power, that use wireless technology for communication and that utilize a form of energy harvesting for generation of power and/or operate primarily or solely from a battery. Examples of totally wireless devices include airplane health monitoring sensors, wireless electronically dimmable windows (EDWs), etc. In instances in which the TWSC application is supported, the integrated wireless network 10 may provide the wireless connectivity between the totally wireless devices and a head-end network.

The application services layer 32 of the integrated wireless network architecture of FIG. 2 may describe a set of available functions provided by the integrated wireless network 10 to its member applications. Such services may include a print service, a data load service, an offboard link manager service, a secure avionics interface service, and a file storage service, all of which provide a generic interface for integrated wireless architecture clients to securely access authorized airplane functions. Although the integrated wireless network may provide each of the services, those services encircled with dashed lines in FIG. 2 are provided, in one embodiment, by another network, such as the non-essential wired network, and are subscribed to by the integrated wireless network and its clients.

The network services layer 34 is fully independent of the other layers and includes all software and the operating system (OS) required to provide network functionality including network services such as domain name service (DNS), network time protocol (NTP), dynamic host configuration protocol (DHCP), onboard authentication services (OAS), system log (SYSLOG) services and the like. Further, the network services layer may support a web server. Although some of the services provided by the network services layer may be provided by the integrated wireless network 10, each of the services encircled with a dashed line in the embodiment of FIG. 2 are provided by the non-essential wired network 18 and are subscribed to by the integrated wireless network and its clients.

In regard to the examples of network services identified by FIG. 2, DHCP is used to provide dynamic internet protocol (IP) addresses for CIS maintenance laptops and public cabin Wi-Fi clients. The DNS translates airplane system domain names into IP addresses and permits the assignment of logical names to network devices without having to hardcode actual addresses. The NTP is utilized for synchronizing airplane system clocks over the network and is relied upon by many services including maintenance and logging services. The OAS is the onboard certificate authority and issues new certificates and verifies existing certificates so as to support the airplane public key infrastructure. SYSLOG is configured to report and store the network logs and is used for system management and security auditing. The OS that is also hosted at this layer is software that maintains the components of the integrated wireless network 10 in normal operations following boot up and contains the support to operate and call all higher layer services across all components of the integrated wireless network.

Finally, the network platform layer 26 describes the physical hardware and specific functions required for a particular implementation on an aircraft platform. Further details regarding the elements of the network platform will be described below in conjunction with the components of the integrated wireless network 10.

As shown in FIG. 1, integrated wireless network 10 of one embodiment includes a wireless distribution system 12. The wireless distribution system of one embodiment combines the wireless signals supporting a plurality of wireless systems, such as passenger internet connectivity, mobile phones and distributed airplane functions and outputs the combined signals via a distributed antenna system, as described below. The architecture of a wireless distribution system is shown, for example, in FIG. 3 and includes an applications layer 40, an application services layer 42, a network services layer 44 and a network platform layer 46. In the illustrated embodiment, the wireless distribution system does not host any applications and, as a result, the applications layer is empty. As such, the head-end application hosting in this embodiment may be provided by aircraft networks, such as the non-essential wired network 18 and the avionics network 16. In other embodiments, however, the application layer of the wireless distribution system may include one or more applications. The applications services layer of the illustrated embodiment may be expanded to host other application services, but is shown to host the avionics network data service, a web service for communicating with avionics network. The network services layer of the illustrated embodiment hosts the operating system.

Finally, the network platform layer 46 includes a number of components. In this regard, the network platform layer includes several interfaces including, for example, one or more wired interfaces configured to support wireline communications and one or more wireless interfaces. With respect to the wired interfaces of the illustrated embodiment, the network platform layer of the wireless distribution system may 12 may include a wired interface for supporting an Ethernet connection with the non-essential wired network 18 and a wired connection for supporting a CANBus connection with the avionics network 16. Regarding the wireless interfaces, the network platform layer of the wireless distribution system 12 also generally includes a plurality of wireless radios configured to support wireless communications in accordance with a plurality of different protocols. For example, the wireless distribution system may include a wireless radio configured to support wireless communications in accordance with IEEE 802.11 a/g/n protocols as well as another wireless radio configured to support wireless communications in accordance with the IEEE 802.16 protocol. In this regard, the wireless communications that utilize the IEEE 802.11 protocol may be utilized for various mobility applications, while the wireless communications that utilize the IEEE 802.16 protocol may provide support for high-throughput distributed airplane systems. The wireless distribution system may also include a wireless radio that functions as a base transceiver station to effectively serve as an onboard cell tower and to enable the use of mobile phones, such as onboard mobile telephony devices, onboard the aircraft. Further, the wireless distribution system may include a wireless radio that functions as a network control unit for preventing onboard mobile phones from connecting to terrestrial mobile networks by masking all cellular channels with a radio frequency signal that has sufficient power to overcome all possible signals from outside the cabin compartment of the aircraft.

In addition to the interface functions, the network platform layer 46 of the wireless distribution system 12 may include network functions, such as a routing function, a switching function and integrated radio controller. The routing function and the switching function may be utilized for a single physical connection to the aircraft network and to allow for multiple wireless access points and other integrated wireless network components to connect to the aircraft network. In one embodiment, the routing and switching functions route/switch Open Systems Interconnection (OSI) layer 3 and layer 2 traffic, respectively. The integrated radio controller may be utilized for centrally managing the wireless network including centrally managing authentication, encryption and network policy enforcement.

The network platform layer 46 of the wireless distribution system 12 generally also includes a number of hardware functions including a combiner, such as a radio frequency combiner, that is configured to combine, such as by multiplexing, the wireless signals that are received from the plurality of wireless radios in preparation for transmission. In one embodiment, the hardware functions of the network platform of the wireless distribution system include an extensible firmware interface (EFI). The EFI provides translational functionality between hardware and the operating system of the wireless distribution system. The EFI therefore includes the device drivers and serves as a software interface between the operating system and installed radio or interface firmware. The EFI offers a uniform interface to the operating system and provides a boot manager, protocols for device drivers to provide services and basic runtime services, such as date, time, etc. The network platform may also include one or more antennas, such as a wideband microwave antenna, configured to support the various wireless protocols, such as IEEE 802.11 protocol and onboard mobile telephony radio communications. In one embodiment, the antenna comprises a leaky feeder coaxial antenna.

The wireless distribution system 12 generally comprises a computer, such as a server or any other computing device, that includes one or more processors 50 configured to perform the functions described herein with respect to the wireless distribution system. As shown in FIG. 4, for example, the wireless distribution system of one embodiment may include a processor that is specifically configured to perform the functions of the wireless distribution system. In this regard, the wireless distribution system may also include a memory 52 for storing data as well as instructions that are accessed and executed by the processor in order to direct the performance of the various functions. As described above in conjunction with FIG. 3 and as also shown in FIG. 4, the wireless distribution system may include one or more wired interfaces 54 and one or more wireless interfaces 56, as well as a combiner 58. Although the wired and wireless interfaces and the combiner are illustrated separately from the processor, one or more of these components may be implemented by the processor and/or by the software stored by the memory and executed by the processor. Additionally, the integrated radio controller is not depicted as a separate element and, instead, the functions of the integrated radio controller may be performed by the processor in the illustrated embodiment. As previously described, the wireless distribution also includes one or more antennas 60, such as a leaky feeder antenna, that interfaces with the combiner in order to transmit and receive wireless signals.

The one or more antennas 60 generally extend the length or at least a majority of the length of the cabin compartment so as to provide relatively uniform coverage within the cabin compartment. In operation, the wireless signals that are combined, e.g., multiplexed, by the combiner 58 are provided to the antenna for transmission therealong and radiation throughout the cabin compartment. The antenna of one embodiment is not only configured to transmit wireless signals, but also to receive wireless signals. Alternatively, one or more antennas may transmit the wireless signals, while one or more other antennas may receive wireless signals. In the instance in which the antenna receives wireless signals, the antenna provides the wireless signals to the combiner. The combiner, in turn, is configured to deconstruct the wireless signals to their respective protocols and to then route the deconstructed signals to the appropriate wired interface 54 or wireless interface 56 based upon the respective protocol of the wireless signal.

The integrated wireless network 10 also generally includes one or more wireless data concentrators (WDCs) 14. A wireless data concentrator is a client of the wireless distribution system 12 and may extend the integrated wireless network to other wireless applications and to provide wireless network access for, among other devices, low power and/or non-wireless end points, such as sensors and switches, including devices that may not connect directly to the wireless distribution system, such as those devices outside of the cabin compartment and/or those devices outside of the aircraft. As shown in FIG. 5, a wireless data concentrator may also have an architecture comparable to that described above in conjunction with the integrated wireless network and the wireless distribution system in that the wireless data concentrator may include an applications layer 62, an application services layer 64, a network services layer 66 and a network platform layer 68. Although not shown in FIG. 5, the wireless data concentrators may host a wide variety of applications including, for example, an emergency lighting application and a passenger service functions application. The application services layer of the wireless data concentrator may host various application services, such as the avionics network data service web service for communicating with the avionics network. In one embodiment, however, the application services are hosted by the wireless distribution system with the wireless data concentrator not hosting any application services. The network services layer of the wireless data concentrator also includes the OS to support the running of the software installed on the wireless data concentrator and to access local network functions, security control, SYSLOG, maintenance functions and radio frequency control, such as by adjusting power levels, etc.

The network platform layer 68 of the wireless data concentrator 14 includes the network and other communication interfaces. In this regard, the network platform layer of the wireless data concentrator may include wireless interfaces, e.g., wireless radios, configured to support wireless communications in accordance with a plurality of different protocols. For example, the network platform of the wireless data concentrator may include a wireless radio configured to support communications in accordance with the IEEE802.16 protocol. The network platform of the wireless data concentrator may also include a wireless radio configured to support communications in accordance with the IEEE802.11 protocol. Further, the network platform of the wireless data concentrator may include a wireless radio configured to communicate with totally wireless devices. In one embodiment, the wireless data concentrators are clients of the wireless distribution system 12 so as to support applications hosted by the wireless data concentrators. As such, in one embodiment, the wireless data concentrators utilize the backhaul channel of the wireless radio configured to support the IEEE802.16 protocol for communication with the onboard network so as to bridge wireless data concentrator applications and connected totally wireless clients to the wireless distribution system.

As shown, the network platform layer 68 of the wireless data concentrator 14 may include an integrated radio controller for locally managing the radio operation, including channel assignment, authentication, power levels, protocol usage and load management. However, in one embodiment, the operation of the wireless radios of the wireless data concentrator may be centrally managed by the radio controller of the wireless distribution system 12. Although the network platform layer of the wireless data concentrator is described to include several interfaces, the wireless data concentrator may include additional or alternative interfaces in other embodiments, including interfaces configured to support power line communications, such as to support WPSU functions, to support battery backup and/or discrete lighting so as to support the WELS function. In the illustrated embodiment, the network platform layer of the wireless data concentrator also includes EFI, a routing function and a switching function, as described above in conjunction with the wireless distribution system.

As shown in FIG. 1, the wireless data concentrators 14 may communicate with a variety of different clients. For example, a wireless data concentrator may wirelessly communicate, such as by means of a totally wireless radio interface, with a client responsible for dimming windows. Other wireless data concentrators may communicate, such as by means of a wired interface, with emergency lights or passenger lighting. In at least some instances, the wired interface of the wireless data concentrator may not only provide analog data or signals, but may also provide power, such as by providing power to a passenger service unit (PSU).

By way of other examples depicted in FIG. 1, the wireless distribution system 12 may communicate directly with high throughput, low latency airplane applications. Additionally, the wireless distribution system may communicate directly with those mobile applications that require high throughput and are latency indifferent, such as by wirelessly supporting the communications required by passenger and crew laptops, maintenance laptops and mobile phones.

The wireless data concentrator 14 generally comprises a computer, such as a server or any other computing device, that includes one or more processors 70 configured to perform the functions described herein with respect to the wireless data concentrator. As shown in FIG. 6, for example, the wireless data concentrator of one embodiment may include a processor that is specifically configured to perform the functions of the wireless data concentrator. In this regard, the wireless data concentrator may also include a memory 72 for storing data as well as instructions that are accessed and executed by the processor in order to direct the performance of the various functions. As described above in conjunction with FIG. 5 and as also shown in FIG. 6, the wireless data concentrator may include one or more wired interfaces 74 and one or more wireless interfaces 76. Although the wired and wireless interfaces are illustrated separately from the processor, one or more of these components may be implemented by the processor and/or by the software stored by the memory and executed by the processor.

As described above, the antenna 60 of the wireless distribution system 12, such as a leaky feeder coaxial antenna, extends through the cabin compartment and serves as a distribution system for the wireless communication signals. While adequate coverage is provided within the cabin compartment, it may desirable to provide additional coverage for reliable connectivity to maintenance personnel and to others external to the aircraft or within the cargo or other non-cabin bays in instances in which the cabin floor is formed, for example, of a carbon fiber composite material that provides some measure of radio frequency isolation.

As shown in FIG. 7, a wireless data concentrator 14a may be positioned so as to wirelessly communicate both with the antenna 60 of the wireless distribution system 12 and clients and/or other wireless data concentrators in a cargo compartment that is otherwise shielded or isolated from the cabin compartment by the floor. Additionally or alternatively, a wireless data concentrator 14b may be positioned so as to wirelessly communicate both with the antenna of the wireless distribution system and clients and/or other wireless data concentrators outside of or external to the aircraft.

By way of example, the wireless distribution system 12 of FIG. 7 may wirelessly communicate with one or more wireless data concentrators (WDCs) 14 within the cabin compartment. The wireless data concentrators may, in turn, communicate with their clients, such as low power wireless devices (LWD) 78, e.g., wireless sensors or switches, via wireless low power personal area network connections as depicted in FIG. 7. The wireless distribution system may also directly wirelessly communicate with other components, such as the mobile wireless devices (MWDs) 79, e.g., portable computers and mobile telephones, via wireless local area network connections as depicted in FIG. 7. However, for those clients external to the cabin compartment, the integrated wireless network 10 may include a wireless data concentrator(s) positioned so as to wirelessly receive signals from the wireless distribution system, such as those wireless signals radiated by the antenna 60, and to then wirelessly communicate with various clients or other wireless data concentrators outside of the cabin compartment. In this regard, the wireless data concentrator(s) that bridges the wireless communication signals from within the cabin compartment to outside of the cabin compartment may communicate directly with the wireless distribution system via the antenna and/or may be in indirect communication with the antenna of the wireless distribution system via another wireless data concentrator within the cabin compartment.

In order to permit a wireless data concentrator 14 to both wirelessly communicate within the cabin compartment and outside of the cabin compartment, the wireless data concentrator may be selectively positioned to have radio frequency visibility in both regions. As shown in FIG. 8, for example, a wireless data concentrator 14a may be positioned within the return air gap 82 that exists between the cabin floor and the fuselage. In this position, the wireless data concentrator may be in wireless communication with the wireless distribution system 12, but may also be in wireless communication with clients or other wireless data concentrators in the cargo bays 84 that are separated from the cabin compartment 80 by the cabin floor. Alternatively or additionally, a wireless data concentrator 14b may be positioned proximate a window or window plug 88 that is transparent to radio frequency signals, as shown in FIG. 9. In this regard, for example, a wireless data concentrator may be positioned behind a monument or other internal structural feature 86 near a window or window plug that is transparent to radio frequency signals. As such, the wireless data concentrator may be in wireless communication with both the wireless distribution system and with clients or other wireless data concentrators external to the cabin compartment.

In at least some embodiments, including that depicted in FIG. 7, the integrated wireless network 10 permits wireless data concentrators 14a to relay or pass along wireless communication signals from another wireless data concentrator. As shown, the other WDC 14c may be outside the cabin compartment 80. As such, the network of wireless data concentrators may serve as a relay network or a mesh network so as to facilitate reliable and energy efficient wireless communication via a wireless multihop relay connection.

In one embodiment, the integrated wireless network 10 allows for a reduction in line replaceable units including wireless access points, antennas, and other wireless hardware which, in turn provide for a reduction in the wiring. Such reductions advantageously provide weight savings, power reduction and reduced cooling costs relative to comparable federated networks. The reduction in system wiring may also beneficially reduce the wire design, wire assembly and wire installation costs. Further, and in comparison to federated networks that may require relatively complex network management to handle traffic loading, security policies and procedures, quality of service and availability requirements, the integrated wireless network may provide these features in addition to wireless spectrum management using a single entry point for wireless systems. The integrated wireless network of one embodiment is also built upon a foundation that readily permits expansion or addition as additional or new technology is developed without requiring a redesign of the underlying network or its components. Similarly, the integrated wireless network of one embodiment is scalable to support multiple aircraft models.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A network for facilitating wireless communication onboard an aircraft, the network comprising:
    an avionics network comprising a wired system onboard the aircraft for providing network connectivity for one or more network applications; and
    an integrated wireless network comprising:
        a wireless distribution system comprising a wired interface configured to support wireline communications with the avionics network, a plurality of wireless radios configured to support wireless communications in accordance with a plurality of different protocols, a combiner configured to combine wireless signals received by the plurality of wireless radios, and an antenna extending through a cabin compartment of the aircraft, wherein the combiner provides the combined wireless signals to the antenna for transmission throughout the cabin compartment, and wherein the combiner deconstructs wireless signals received by the antenna and provides the deconstructed wireless signals to a respective wireless radio; and
        one or more wireless data concentrators in communication with the antenna, wherein at least one wireless data concentrator comprises a plurality of wireless radios configured to support wireless communications in accordance with a plurality of different protocols,
    wherein the wireless distribution system is configured to support communications between the avionics network and one or more of the wireless radios,
    wherein each of the integrated wireless network, the wireless distribution system and the one or more wireless data concentrators are organized into a plurality of abstraction layers comprising an applications layer, an application services layer, a network services layer and a network platform layer with one or more of the abstraction layers of the integrated wireless network, the wireless distribution system and the one or more wireless data concentrators including different components.

2. A network according to claim 1 wherein the antenna comprises a leaky feeder antenna.

3. A network according to claim 1 wherein the at least one wireless data concentrator further comprises a radio controller configured to manage the plurality of wireless radios.

4. A network according to claim 1 wherein the one or more wireless data concentrators comprises a first wireless data concentrator disposed within the cabin compartment and a second wireless data concentrator disposed outside of the cabin compartment, wherein the first wireless data concentrator is configured to relay communications between the second wireless data concentrator and the antenna of the wireless distribution system.

5. A network according to claim 4 wherein the first and second wireless data concentrators comprise at least one of a relay network or a mesh network.

6. A network according to claim 1 wherein the wireless distribution system further comprises a base transceiver station configured to support mobile telephony communications onboard the aircraft.

7. A network according to claim 1 wherein the wireless distribution system further comprises a network control unit configured to prevent mobile telephones onboard the aircraft from establishing communications with a terrestrial mobile network.

8. A network according to claim 1 wherein a wireless data concentrator is positioned within a return air gap between a floor and a fuselage of the aircraft.

9. A network according to claim 1 wherein a wireless data concentrator is positioned relative to a window or window plug that is transparent to radio frequency signals so as to establish wireless communication outside of the cabin compartment.

10. An aircraft comprising:
a cabin compartment; and
an avionics network comprising a wired system onboard the aircraft for providing network connectivity for one or more network applications;
an integrated wireless network for facilitating wireless communication onboard the aircraft, the integrated wireless network comprising:
a wireless distribution system comprising a wired interface configured to support wireline communications with the avionics network, a plurality of wireless radios configured to support wireless communications in accordance with a plurality of different protocols, a combiner configured to combine the wireless signals received by the plurality of wireless radios, and an antenna extending through the cabin compartment and configured to transmit the combined wireless signals, wherein the wireless distribution system is configured to support communications between the avionics network and one or more of the wireless radios; and
a plurality of wireless data concentrators in communication with the antenna, wherein at least one wireless data concentrator comprises a plurality of wireless radios configured to support wireless communications in accordance with a plurality of different protocols, and wherein the plurality of wireless data concentrators comprise a first wireless data concentrator disposed within the cabin compartment and a second wireless data concentrator disposed outside of the cabin compartment,
wherein each of the integrated wireless network, the wireless distribution system and the plurality of wireless data concentrators are organized into a plurality of abstraction layers comprising an applications layer, an application services layer, a network services layer and a network platform layer with one or more of the abstraction layers of the integrated wireless network, the wireless distribution system and the plurality of wireless data concentrators including different components.

11. An aircraft according to claim 10 wherein the antenna comprises a leaky feeder antenna.

12. An aircraft according to claim 10 wherein the at least one wireless data concentrator further comprises a radio controller configured to manage the plurality of wireless radios.

13. An aircraft according to claim 10 wherein the first wireless data concentrator is configured to relay communications between the second wireless data concentrator and the antenna of the wireless distribution system, and wherein the first and second wireless data concentrators comprise at least one of a relay network or a mesh network.

14. An aircraft according to claim 10 wherein the wireless distribution system further comprises a base transceiver station configured to support mobile telephony communications onboard the aircraft.

15. An aircraft according to claim 10 wherein the wireless distribution system further comprises a network control unit configured to prevent mobile telephones onboard the aircraft from establishing communications with a terrestrial mobile network.

16. An aircraft according to claim 10 wherein the first wireless data concentrator is positioned within a return air gap between a floor and a fuselage of the aircraft.

17. An aircraft according to claim 10 wherein the first wireless data concentrator is positioned relative to a window or window plug that is transparent to radio frequency signals so as to establish wireless communication outside of the cabin compartment.

18. A method comprising:
communicating with an avionics network via a wired interface, wherein the avionics network comprising a wired system onboard an aircraft for providing network connectivity for one or more network applications;
receiving wireless signals onboard an aircraft with a plurality of wireless radios;
combining the wireless signals with an integrated wireless network comprising a wireless distribution system;
transmitting the wireless signals, following combination, via an antenna of the wireless distribution system that extends through a cabin compartment of the aircraft;
receiving the wireless signals, following transmission, with a wireless radio of a first wireless data concentrator;
relaying the wireless signals from the first wireless data concentrator to a wireless radio of a second wireless data concentrator positioned outside of the cabin compartment of the aircraft; and
supporting communications between the avionics network and one of more of the wireless radios,
wherein each of the integrated wireless network, the wireless distribution system and one or more of the first and second wireless data concentrators are organized into a plurality of abstraction layers comprising an applications layer, an application services layer, a network services layer and a network platform layer with one or more of the abstraction layers of the integrated wireless network, the wireless distribution system and the one or more of the first and second wireless data concentrators including different components.

19. A method according to claim 18 further comprising relaying wireless signals from the second wireless data concentrator via the first wireless data concentrator to the antenna that extends through the cabin compartment of the aircraft, deconstructing the wireless signals that are received by the antenna and providing the wireless signals, following deconstruction, to a respective wireless radio.

20. A method according to claim 18 wherein transmitting the wireless signals via an antenna comprises transmitting the wireless signals via a leaky feeder antenna that extends through the cabin compartment of the aircraft.

21. A network according to claim 1 wherein the application layer of the integrated wireless network comprises onboard services and applications that interface with the integrated wireless network, wherein the application services layer of the integrated wireless network describes a set of available functions provided by the integrated wireless network to member applications, wherein the network services layer of the integrated wireless network is independent of all other abstraction layers of the integrated wireless network and all software and operating system required to provide network functionality including network services, and wherein the network platform layer of the integrated wireless network comprises physical hardware required for a particular implementation of the aircraft.

22. A network according to claim 1 wherein the application services layer of the wireless distribution system hosts one or more application services, wherein the network services layer of the wireless distribution system hosts an operating system, and wherein the network platform layer of the wireless distribution system comprises one or more wired interfaces configured to support wireline communications, one or more wireless interfaces, one or more network functions and one or more hardware functions.

23. A network according to claim 1 wherein the network services layer of the one or more wireless data concentrators hosts an operating system, and wherein the network platform layer of the one or more wireless data concentrators comprises network and other communication interfaces.

* * * * *